United States Patent
Hu (10) Patent No.: US 11,216,217 B2
(45) Date of Patent: Jan. 4, 2022

(54) DATA TRANSFER METHOD AFTER DATA ENCRYPTION FUNCTION IS DISABLED AND MEMORY STORAGE DEVICE

(71) Applicant: PHISON ELECTRONICS CORP., Miaoli (TW)

(72) Inventor: Chun-Yang Hu, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 16/847,689

(22) Filed: Apr. 14, 2020

(65) Prior Publication Data

US 2021/0294523 A1 Sep. 23, 2021

(30) Foreign Application Priority Data

Mar. 17, 2020 (TW) ................................. 109108661

(51) Int. Cl.
| | | |
|---|---|---|
| *G06F 13/00* | (2006.01) | |
| *G06F 3/06* | (2006.01) | |
| *G06F 21/79* | (2013.01) | |
| *G06F 11/10* | (2006.01) | |

(52) U.S. Cl.
CPC .......... *G06F 3/0659* (2013.01); *G06F 3/0604* (2013.01); *G06F 3/0679* (2013.01); *G06F 11/1004* (2013.01); *G06F 21/79* (2013.01)

(58) Field of Classification Search
CPC .. G06F 3/0659; G06F 3/0679; G06F 11/1004; G06F 21/79; G06F 3/0604
See application file for complete search history.

(56) References Cited

U.S. PATENT DOCUMENTS

| | | | | |
|---|---|---|---|---|
| 2002/0107595 A1* | 8/2002 | Abe | ................. | G11B 20/00768 700/94 |
| 2008/0065905 A1* | 3/2008 | Salessi | ..................... | G06F 21/31 713/193 |
| 2011/0271097 A1* | 11/2011 | Joachimpillai | ..... | H04L 63/0485 713/153 |
| 2012/0036351 A1* | 2/2012 | Peet, Jr. | ................ | H04L 49/109 713/150 |
| 2013/0031448 A1* | 1/2013 | Cheng | ................. | H04W 12/106 714/807 |
| 2013/0044607 A1* | 2/2013 | Liu | ......................... | H04W 8/26 370/242 |

(Continued)

FOREIGN PATENT DOCUMENTS

| | | |
|---|---|---|
| TW | 201830284 | 8/2018 |
| TW | I686724 | 3/2020 |

OTHER PUBLICATIONS

"Office Action of Taiwan Counterpart Application", dated Mar. 23, 2021, p. 1-p. 12.

*Primary Examiner* — Jing-Yih Shyu
(74) *Attorney, Agent, or Firm* — JCIPRNET (57) ABSTRACT

A data transfer method includes: instructing a first memory storage device to disable a data encryption function activated by default; and sending a write command to the first memory storage device under a status that the data encryption function of the first memory storage device is disabled. The write command instructs a storing of encryption information of encrypted data to the first memory storage device. The encryption information is not generated by the first memory storage device and is unreadable by a normal read command.

24 Claims, 7 Drawing Sheets

(56) References Cited

U.S. PATENT DOCUMENTS

| | | | |
|---|---|---|---|
| 2016/0342531 A1* | 11/2016 | Sharma | H04L 63/1408 |
| 2016/0357980 A1* | 12/2016 | Balasubramanian | H04L 9/0822 |
| 2019/0042474 A1* | 2/2019 | Edirisooriya | G06F 3/0679 |
| 2019/0087113 A1* | 3/2019 | Isozaki | G06F 3/067 |
| 2020/0201785 A1* | 6/2020 | Hanna | G06F 11/1004 |
| 2020/0293206 A1* | 9/2020 | Isozaki | H04L 9/0891 |

* cited by examiner

DATA TRANSFER METHOD AFTER DATA ENCRYPTION FUNCTION IS DISABLED AND MEMORY STORAGE DEVICE

CROSS-REFERENCE TO RELATED APPLICATION

This application claims the priority benefit of Taiwan application serial no. 109108661, filed on Mar. 17, 2020. The entirety of the above-mentioned patent application is hereby incorporated by reference herein and made a part of this specification.

BACKGROUND

1. Technology Field

The disclosure relates to a data transfer technique, and more particularly, to a data transfer method and a memory storage device.

2. Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

Some types of memory storage devices support automated data encryption and storage. However, for a memory storage device whose encryption function is activated by default, if the device is damaged and internal data needs to be recovered by an external vendor, the vendor is often unable to successfully transfer encrypted data in the device to another device due to the lack of a user password. Alternatively, even if the encrypted data is forcibly transferred to another device, it is likely that the old user password cannot be continually used because of the lack of original encryption information generated during an encryption process in the new device, resulting in a data recovery failure.

SUMMARY

The disclosure provides a data transfer method and a memory storage device capable of solving problems described above.

An exemplary embodiment of the disclosure provides a data transfer method, which includes: instructing a first memory storage device to disable a data encryption function activated by default; and sending a write command to the first memory storage device under a status that the data encryption function of the first memory storage device is disabled. The write command instructs a storing of encryption information of encrypted data to the first memory storage device. The encryption information is not generated by the first memory storage device. The encryption information is unreadable by a normal read command.

An exemplary embodiment of the disclosure further provides a memory storage device, which includes a connection interface unit, a rewritable non-volatile memory module and a memory control circuit unit. The connection interface unit is configured to couple to a host system. The memory control circuit unit is coupled to the connection interface unit and the rewritable non-volatile memory module. The memory control circuit unit is configured to disable a data encryption function activated by default according to an instruction of the host system. The memory control circuit unit is further configured to receive a write command from the host system under a status that the data encryption function is disabled. The write command instructs a storing of encryption information of encrypted data to the memory storage device. The encryption information is not generated by the memory storage device. The encryption information is unreadable by a normal read command.

An exemplary embodiment of the disclosure further provides a memory storage device, which includes a connection interface unit, a rewritable non-volatile memory module and a memory control circuit unit. The connection interface unit is configured to couple to a host system. The memory control circuit unit is coupled to the connection interface unit and the rewritable non-volatile memory module. The memory control circuit unit is configured to disable a data decryption function activated by default according to an instruction of the host system. The memory control circuit unit is further configured to receive a read command from the host system under a status that the data decryption function is disabled. The read command instructs a reading of encryption information of encrypted data from the memory storage device. The encryption information is unreadable by a normal read command.

Based on the above, after the data encryption function of the memory storage device activated by default is disabled, the encrypted data and the corresponding encryption information may be respectively stored to the memory storage device through the customized write commands. Accordingly, after the data transfer is completed subsequently, the old user password may still be used to decrypt the encrypted data, thereby solving the conventional problem that a data recovery cannot be performed on the memory storage devices that support an automated data encryption.

It should be understood, however, that this Summary may not contain all of the aspects and embodiments of the present disclosure, is not meant to be limiting or restrictive in any manner, and that the disclosure as disclosed herein is and will be understood by those of ordinary skill in the art to encompass obvious improvements and modifications thereto.

DESCRIPTION OF THE EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the disclosure may comprise any one or more of the novel features described herein, including in the detailed description, and/or shown in the drawings. As used herein, "at least one," "one or more," and "and/or" are open-ended expressions that are both conjunctive and disjunctive in operation. For instance, each of the expressions "at least on of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage device (a.k.a. a memory storage system) includes a rewritable non-volatile memory module and a controller (a.k.a. a control circuit). The memory storage device usually operates together with a host system so the host system can write data into the memory storage device or read data from the memory storage device.

Figure 1:
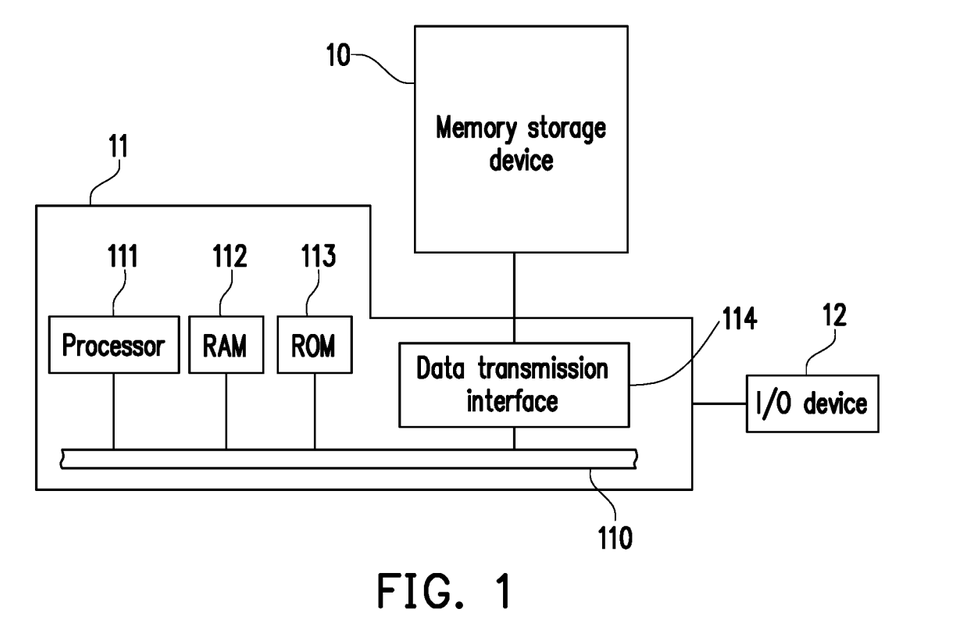
FIG. 1 is a schematic diagram illustrating a host system, a memory storage device and an I/O (input/output) device according to an exemplary embodiment of the disclosure.
Figure 2:
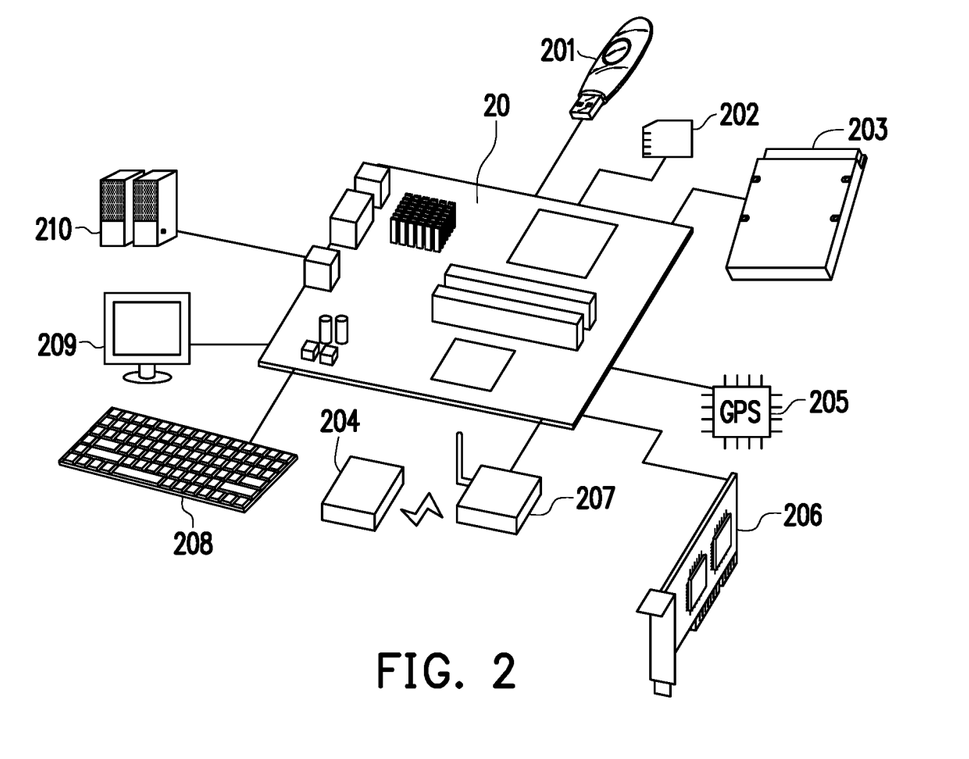
FIG. 2 is a schematic diagram illustrating a host system, a memory storage device and an I/O device according to another exemplary embodiment of the disclosure.

FIG. 1 is a schematic diagram illustrating a host system, a memory storage device and an I/O (input/output) device according to an exemplary embodiment of the disclosure. FIG. 2 is a schematic diagram illustrating a host system, a memory storage device and an I/O device according to another exemplary embodiment of the disclosure.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a memory storage device 10 through the data transmission interface 114. For example, the host system 11 can store data into the memory storage device 10 or read data from the memory storage device 10 via the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
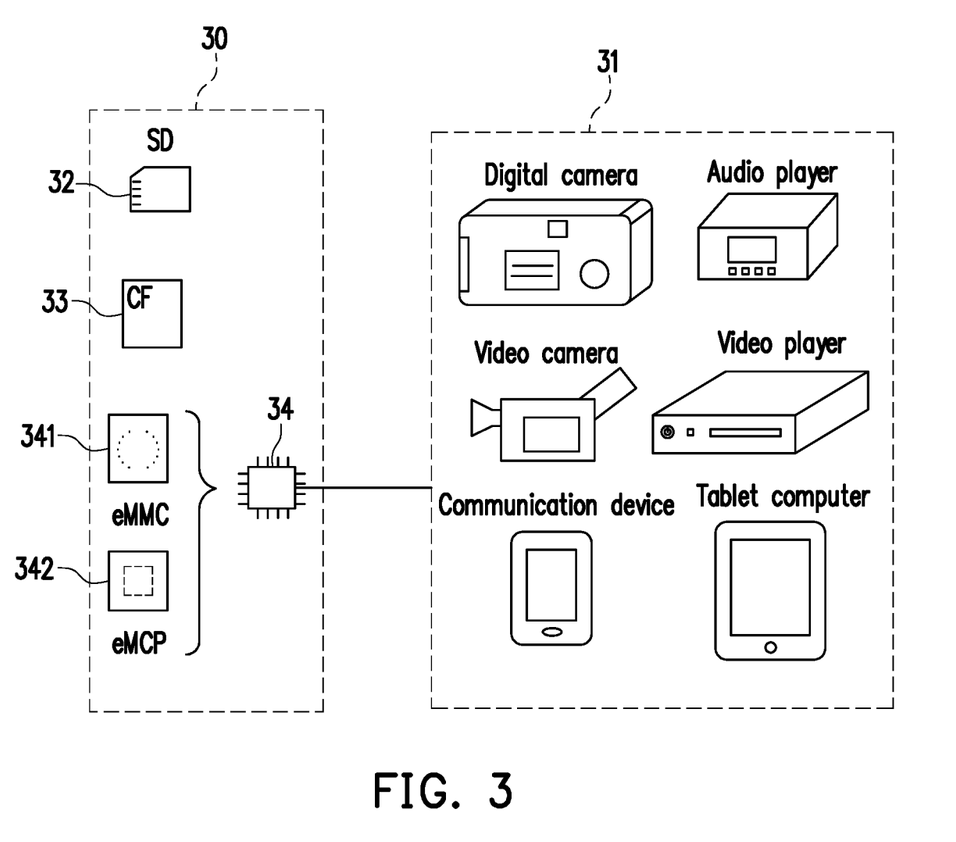
FIG. 3 is a schematic diagram illustrating a host system and a memory storage device according to another exemplary embodiment of the disclosure.

In an exemplary embodiment, aforementioned host system may be any system capable of substantially cooperating with the memory storage device for storing data. Although the host system is illustrated as a computer system in foregoing exemplary embodiment, nonetheless, FIG. 3 is a schematic diagram illustrating a host system and a memory storage device according to another exemplary embodiment of the disclosure. Referring to FIG. 3, in another exemplary embodiment, a host system 31 may also be a system such as a digital camera, a video camera, a communication device, an audio player, a video player or a tablet computer, whereas a memory storage device 30 may be various non-volatile memory storage devices used by the host system, such as a SD (Secure Digital) card 32, a CF (Compact Flash) card 33 or an embedded storage device 34. The embedded storage device 34 includes various embedded storage devices capable of directly coupling a memory module onto a substrate of the host system, such as an eMMC (embedded Multi Media Card) 341 and/or an eMCP (embedded Multi Chip Package) storage device 342.

Figure 4:
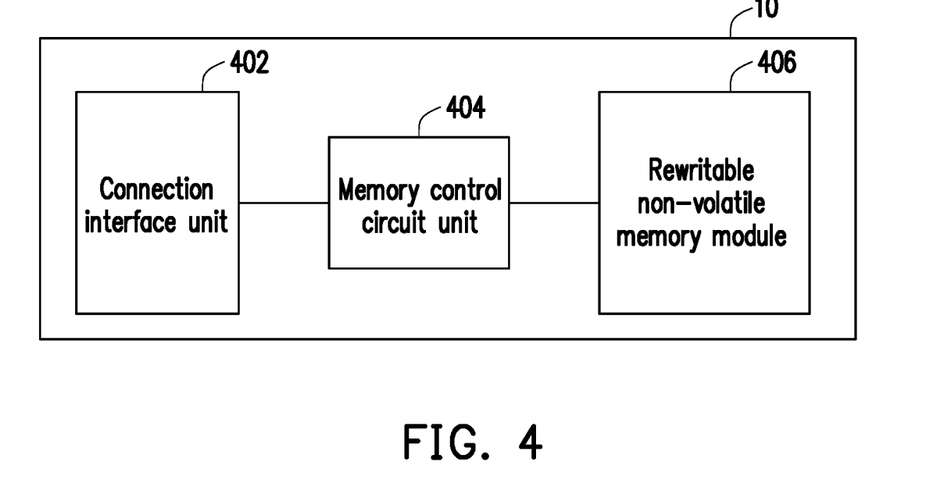
FIG. 4 is a schematic block diagram illustrating a memory storage device according to an exemplary embodiment of the disclosure.

FIG. 4 is a schematic block diagram illustrating a memory storage device according to an exemplary embodiment of the disclosure. Referring to FIG. 4, the memory storage device 10 includes a connection interface unit 402, a memory control circuit unit 404 and a rewritable non-volatile memory module 406.

The connection interface unit 402 is configured to couple to the memory storage device 10 to the host system 11. The memory storage device 10 can communicate with the host system 11 through the connection interface unit 402. In this exemplary embodiment, the connection interface unit 402 is compatible with a SATA (Serial Advanced Technology Attachment) standard. Nevertheless, it should be understood that the disclosure is not limited in this regard. The connection interface unit 402 may also be compatible with a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a MCP interface standard, a MMC interface standard, an eMMC interface standard, a UFS (Universal Flash Storage) interface standard, an eMCP interface standard, a CF interface standard, an IDE (Integrated Device Electronics) interface standard or other suitable standards. The connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control commands which are implemented in a hardware form or in a firmware form and perform operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), an MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), a Quad Level Cell (MLC) NAND-type flash memory module (i.e., a flash memory module capable of storing four bits in one memory cell), other flash memory modules or other memory modules having the same features.

In the rewritable non-volatile memory module 406, one or more bits are stored by changing a voltage (hereinafter, also known as a threshold voltage) of each of the memory cells. More specifically, in each of the memory cells, a charge trapping layer is provided between a control gate and a channel. Amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". With changes in the threshold voltage, each of the memory cells in the rewritable non-volatile memory module 406 has a plurality of storage states. The storage state to which the memory cell belongs may be determined by applying a read voltage to the memory cell, so as to obtain the one or more bits stored in the memory cell.

In this exemplary embodiment, the memory cells of the rewritable non-volatile memory module 406 may constitute a plurality of physical programming units, and the physical programming units can constitute a plurality of physical erasing units. Specifically, the memory cells on the same word line may constitute one or more of the physical programming units. If each of the memory cells can store two or more bits, the physical programming units on the same word line may be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. Generally, in the MLC NAND flash memory, a writing speed of the lower physical programming unit is higher than a writing speed of the upper physical programming unit, and/or a reliability of the lower physical programming unit is higher than a reliability of the upper physical programming unit.

In this exemplary embodiment, the physical programming unit is the minimum unit for programming. That is, the physical programming unit is the minimum unit for writing data. For example, the physical programming unit may be a physical page or a physical sector. If the physical programming unit is the physical page, these physical programming units may include a data bit area and a redundancy bit area. The data bit area contains multiple physical sectors configured to store user data, and the redundant bit area is configured to store system data (e.g., management data such as an error correcting code, etc.). In this exemplary embodiment, the data bit area contains 32 physical sectors, and a size of each physical sector is 512 bytes (B). However, in other exemplary embodiments, the data bit area may also contain 8, 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

Figure 5:
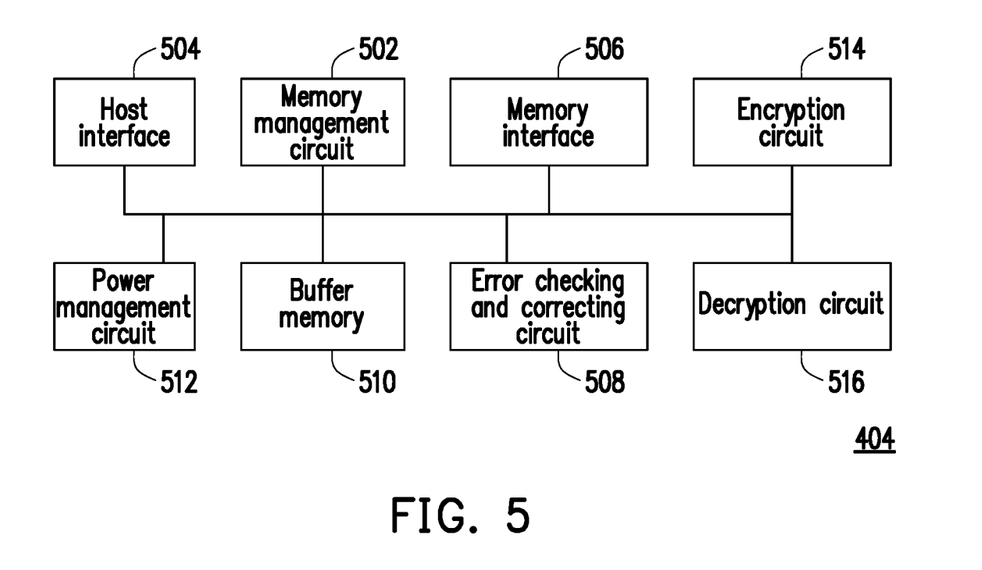
FIG. 5 is a schematic block diagram illustrating a memory control circuit unit according to an exemplary embodiment of the invention.

FIG. 5 is a schematic block diagram illustrating a memory control circuit unit according to an exemplary embodiment of the disclosure. Referring to FIG. 5, the memory control circuit unit 404 includes a memory management circuit 502, a host interface 504 and a memory interface 506.

The memory management circuit 502 is configured to control overall operation of the memory control circuit unit 404. Specifically, the memory management circuit 502 has a plurality of control commands. When the memory storage device 10 operates, the control commands are executed to perform various operations such as data writing, data reading and data erasing. Hereinafter, operations of the memory management circuit 502 are described as equivalent to operations of the memory control circuit unit 404.

In this exemplary embodiment, the control commands of the memory management circuit 502 are implemented in form of firmware. For instance, the memory management circuit 502 has a microprocessor unit (not illustrated) and a ROM (not illustrated), and the control commands are burned into the ROM. When the memory storage device 10 operates, the control commands are executed by the microprocessor to execute operations of writing, reading or erasing data.

In another exemplary embodiment, the control commands of the memory management circuit 502 may also be stored in form of program codes in a specific area (e.g., a system area in a memory exclusively used for storing system data) of the rewritable non-volatile memory module 406. In addition, the memory management circuit 502 has a microprocessor unit (not illustrated), a ROM (not illustrated) and a RAM (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to execute operations, such as writing, reading or erasing data.

Further, in another exemplary embodiment, the control commands of the memory management circuit 502 may also be implemented in form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of a memory cell group of the rewritable non-volatile memory module 406. The memory writing circuit is configured to issue a write command sequence for the rewritable non-volatile memory module 406 to write data into the rewritable non-volatile memory module 406. The memory reading circuit is configured to issue a read command sequence for the rewritable non-volatile memory module 406 to read data from the rewritable non-volatile memory module 406. The memory erasing circuit is configured to issue an erase command sequence for the rewritable non-volatile memory module 406 to erase data from the rewritable non-volatile memory module 406. The data processing circuit is configured to process data to be written into the rewritable non-volatile memory module 406 and data read from the rewritable non-volatile memory module 406. Each of the write command sequence, the read command sequence and the erase command sequence may include one or more program codes or command codes, and instruct the rewritable non-volatile memory module 406 to perform the corresponding operations, such as writing, reading and erasing. In an exemplary embodiment, the memory management circuit 502 may further give command sequence of other types to the rewritable non-volatile memory module 406 for instructing to perform the corresponding operations.

The host interface 504 is coupled to the memory management circuit 502. The memory management circuit 502 can communicate with the host system 11 through the host interface 504. The host interface 504 may be used to receive and identify commands and data transmitted by the host system 11. For example, the commands and the data transmitted by the host system 11 may be transmitted to the memory management circuit 502 via the host interface 504. In addition, the memory management circuit 502 can transmit data to the host system 11 via the host interface 504. In this exemplary embodiment, the host interface 504 is compatible with the SATA standard. However, it should be understood that the disclosure is not limited thereto, and the host interface 504 may also be compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends corresponding command sequences. For example, the command sequences may include the write command sequence as an instruction for writing data, the read command sequence as an instruction for reading data, the erase command sequence as an instruction for erasing data, and other corresponding command sequences as instructions for performing various memory operations (e.g., changing read voltage levels or performing a garbage collection procedure). These command sequences are generated by the memory management circuit 502 and transmitted to the rewritable non-volatile memory module 406 via the memory interface 506, for example. The command sequences may include one or more signals, or data transmitted in the bus. The signals or the data may include command codes and program codes. For example, information such as identification codes and memory addresses are included in the read command sequence.

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and configured to execute an error checking and correcting operation to ensure the correctness of data. Specifically, when the memory management circuit 502 receives the writing command from the host system 11, the error checking and correcting circuit 508 generates an error correcting code (ECC) or an error detecting code (EDC) for data corresponding to the writing command, and the memory management circuit 502 writes data and the ECC or the EDC corresponding to the writing command to the rewritable non-volatile memory module 406. Then, when the memory management circuit 502 reads the data from the rewritable non-volatile memory module 406, the corresponding ECC and/or the EDC are also read, and the error checking and correcting circuit 508 executes the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the memory storage device 10.

In an exemplary embodiment, the memory control circuit unit 404 further includes an encryption circuit 514 and a decryption circuit 516. The encryption circuit 514 supports a data encryption function and is configured to encrypt data to be stored to the rewritable non-volatile memory module 406. The decryption circuit 516 supports a data decryption function and is configured to decrypt data read from the rewritable non-volatile memory module 406.

In an exemplary embodiment, the rewritable non-volatile memory module 406 of FIG. 4 is also known as a flash memory module; the memory control circuit unit 404 is also known as a flash memory controller for controlling the flash memory module; and/or the memory management circuit 502 of FIG. 5 is also known as a flash memory management circuit.

Figure 6:
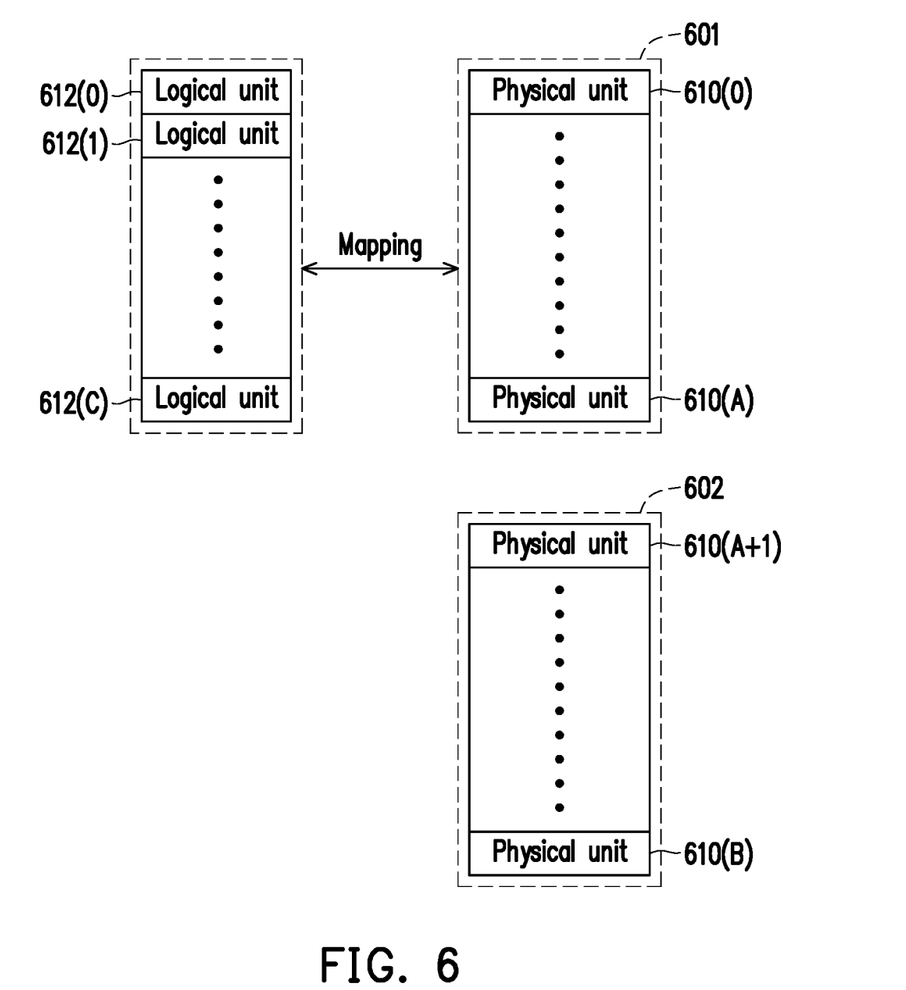
FIG. 6 is a schematic diagram illustrating management of a rewritable non-volatile memory module according to an exemplary embodiment of the disclosure.

FIG. 6 is a schematic diagram illustrating management of a rewritable non-volatile memory module according to an exemplary embodiment of the disclosure.

Referring to FIG. 6, the memory management circuit 502 logically groups physical units 610(0) to 610(B) of the rewritable non-volatile memory module 406 into a storage area 601 and a replacement area 602. The physical units 610(0) to 610(A) in the storage area 601 are configured to store data, and the physical units 610(A+1) to 610(B) in the replacement area 602 are configured to replace damaged physical units in the storage area 601. For example, if data read from one specific physical unit includes too many errors and these errors cannot be corrected, the specific physical unit is regarded as a damaged physical unit. It should be noted that, if there are no available physical erasing units in the replacement area 602, the memory management circuit 502 may declare the memory storage device 10 as in a write protect state so data can no longer be written thereto.

In the present exemplary embodiment, each physical unit refers to one physical erasing unit. However, in another exemplary embodiment, one physical unit may also refer to one physical address, one physical programming unit, or a composition of a plurality of continuous or discontinuous physical addresses. The memory management circuit 502 assigns logical units 612(0) to 612(C) for mapping to the physical units 610(0) to 610(A) in the storage area 601. In the present exemplary embodiment, each logical unit refers to one logical address. However, in another exemplary embodiment, each logical unit may also refer to one logical programming unit, one logical erasing unit or a composition of a plurality of continuous or discontinuous logical addresses. In addition, each of the logical units 612(0) to 612(C) may also be mapped to one or more physical units.

The memory management circuit 502 records a mapping relation (a.k.a. a logical-physical address mapping relation) between the logical units and the physical units into at least one logical-physical address mapping table. When the host system 11 intends to read the data from the memory storage device 10 or write the data into the memory storage device 10, the memory management circuit 502 can perform a data accessing operation on the memory storage device 10 according to the logical-physical address mapping table.

In an exemplary embodiment, the encryption circuit 514 and the decryption circuit 516 of FIG. 5 are both activated by default. In other words, if the data encryption function is not specifically instructed to be disabled, the encryption circuit 514 will remain in an activated state after the memory storage device 10 is turned on. Similarly, if the data decryption function is not specifically instructed to be disabled, the decryption circuit 516 will remain in an activated state after the memory storage device 10 is turned on.

In an exemplary embodiment, under a status that the data encryption function is activated, when receiving a write command instructing a storing of specific data (a.k.a. raw data) from the host system 11, the encryption circuit 514 may encrypt the raw data according to an encryption key to generate encrypted data. The memory management circuit 502 may store the encrypted data together with information generated during an encryption process (a.k.a. encryption information) to the rewritable non-volatile memory module 406. In an exemplary embodiment, the encrypted data and the encryption information of the encrypted data may be stored in the same data frame. For example, one data frame may refer to one physical programming unit or other data management unit in the rewritable non-volatile memory module 406.

In an exemplary embodiment, under a status that the data decryption function is activated, when receiving a read command instructing a reading of specific encrypted data from the host system 11, the decryption circuit 516 may decrypt the encrypted data according to a decryption key and encryption information corresponding to the specific encrypted data to obtain raw data. Then, the memory management circuit 502 may transmit the raw data to the host system 11. In addition, if the decryption key and/or the encryption information are incorrect, the decryption circuit 516 cannot successfully decrypt the encrypted data.

In an exemplary embodiment, the encryption information may include a cyclic redundancy check (CRC) code. In an exemplary embodiment, the encryption circuit 514 may generate this CRC code (or encryption information of other types) according to the raw data to be stored and the encryption key (or the decryption key). In an exemplary embodiment, the encryption circuit 514 may also generate this CRC code (or encryption information of other types) according to the raw data to be stored, information related to the logical address of the raw data (a.k.a. logical address information), and the encryption key (or the decryption key).

In an exemplary embodiment, the encryption circuit 514 and the decryption circuit 516 use a symmetric-key algorithm such as DES, 3DES, AES, Blowfish, IDEA, RC5 or RC6. In the symmetric-key algorithm, the encryption key and the decryption key are identical. Nonetheless, in another exemplary embodiment, if the encryption circuit 514 and the decryption circuit 516 use a public-key cryptography (a.k.a. asymmetric cryptography) such as RSA, ElGamal or an elliptic Curve Cryptography (ECC), the encryption key and the decryption key may be different.

Figure 7:
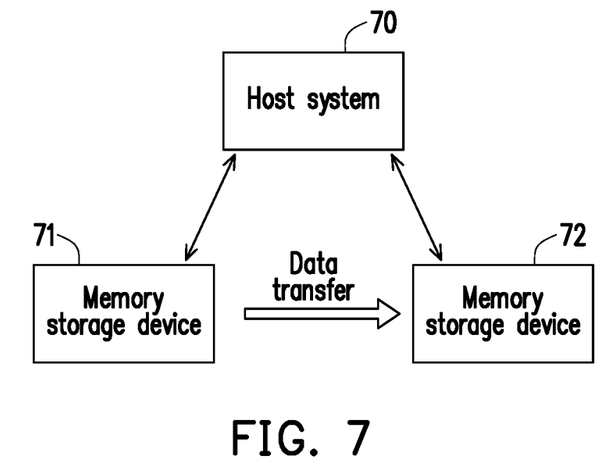
FIG. 7 is a schematic diagram illustrating a data transfer according to an exemplary embodiment of the disclosure.

FIG. 7 is a schematic diagram illustrating a data transfer according to an exemplary embodiment of the disclosure. Referring to FIG. 7, a host system 70 is coupled to memory storage devices 71 and 72. In an exemplary embodiment, the memory storage device 72 is also known as a first memory storage device, and the memory storage device 71 is also known as a second memory storage device. If the memory storage device 71 is damaged or encounters any situation that requires recovery of its internally stored data (e.g., the memory storage device 71 cannot be turned on normally), the host system 70 may control the memory storage device 71 to transfer its stored data to the memory storage device 72.

It should be noted that, if the memory storage device 71 is stored with the encrypted data, the decryption key (e.g., a user password) and the encryption information originally used to decrypt the encrypted data in the memory storage device 71 may also be used to decrypt the encrypted data transferred to the memory storage device 72. In other words, it is assumed that one specific user password may originally be used to decrypt the encrypted data stored in the memory storage device 71. After at least part of the encrypted data is transferred from the memory storage device 71 to the memory storage device 72, the specific user password may still be used to normally decrypt the encrypted data transferred to the memory storage device 72.

In an exemplary embodiment, if the host system 70 is a computer of a supplier or a repairer, in the case where the supplier or the repairer are unable to learn the user password of the memory storage device 71, the supplier or the repairer may still be able to successfully recover data in the memory storage device 71 and transfer the data to the memory storage device 72 that can be used normally. After the memory storage device 72 is handed over to the user, the user may normally access the encrypted data in the memory storage device 72 by using the original user password.

Figure 8:
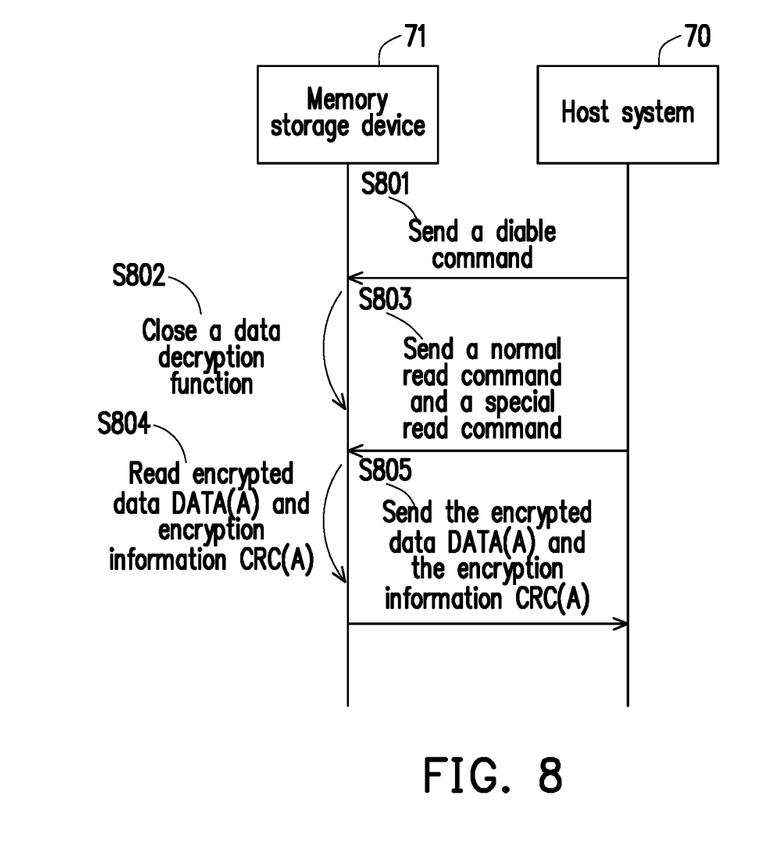
FIG. 8 is a schematic diagram illustrating a timing sequence of communication between the host system and the second memory storage device according to an exemplary embodiment of the disclosure.

FIG. 8 is a schematic diagram illustrating a timing sequence of communication between the host system and the second memory storage device according to an exemplary embodiment of the disclosure. Referring to FIG. 8, in step S801, the host system 70 transmits a disable command to the memory storage device 71. The disable command is used to instruct the memory storage device 71 to disable a data decryption function activated by default. Accordingly, in step S802, in response to the disable command, the memory control circuit unit of the memory storage device 71 may disable the data decryption function of the decryption circuit activated by default.

Under a status that the data decryption function of the memory storage device 71 is disabled, in step S803, the host system 70 may send a normal read command and a special read command to the memory storage device 71. The normal read command instructs a reading of encrypted data DATA(A). The special read command instructs a reading of encryption information CRC(A). The encryption information CRC(A) may be used to decrypt the encrypted data DATA(A).

In step S804, the memory control circuit unit of the memory storage device 71 may read the encrypted data DATA(A) from the rewritable non-volatile memory module of the memory storage device 71 in response to the normal read command and read the encryption information CRC(A) from the rewritable non-volatile memory module of the memory storage device 71 in response to the special read command.

It should be noted that although the memory storage device 71 supports the automated data decryption function, as the data decryption function is disabled in advance, both the reading of the encrypted data DATA(A) and the reading of the encryption information CRC(A) do not include decrypting the encrypted data DATA(A) and the encryption information CRC(A). Then, in step S805, the memory control circuit unit of the memory storage device 71 may transmit the encrypted data DATA(A) and the encryption information CRC(A), which are not decrypted, to the host system 70.

It should be noted that, in an exemplary embodiment, in step S803, the host system 70 may also transmit only the special read command without transmitting the normal read command. The transmitted special read command may instruct the memory control circuit unit of the memory storage device 71 to read the encrypted data DATA(A) and the encryption information CRC(A) in step S804.

In an exemplary embodiment, the memory control circuit unit of the memory storage device 71 may reestablish corresponding logical-physical mapping information (e.g., a logical-physical mapping table) according to physical-to-logical mapping information stored in the rewritable non-volatile memory module. The logical-physical mapping information may be used to read valid data in the rewritable non-volatile memory module. For example, if one physical unit is currently mapped to one logical unit, data stored by that physical unit may be regarded as containing the valid data. Conversely, if one physical unit is currently not mapped to one logical unit, data stored by that physical unit may be regarded as not containing the valid data.

In an exemplary embodiment, according to the read command received in step S803, the memory control circuit unit of the memory storage device 71 may check the established logical-physical mapping information to read the valid encrypted data DATA(A) and the corresponding CRC (A) in the rewritable non-volatile memory module. In an exemplary embodiment, according to the read command received in step S803, the memory control circuit unit of the memory storage device 71 may also transmit the logical address information corresponding to the encrypted data DATA(A) (data of the logical unit to which the encrypted data DATA(A) belongs) to the host system 70.

Figure 9:
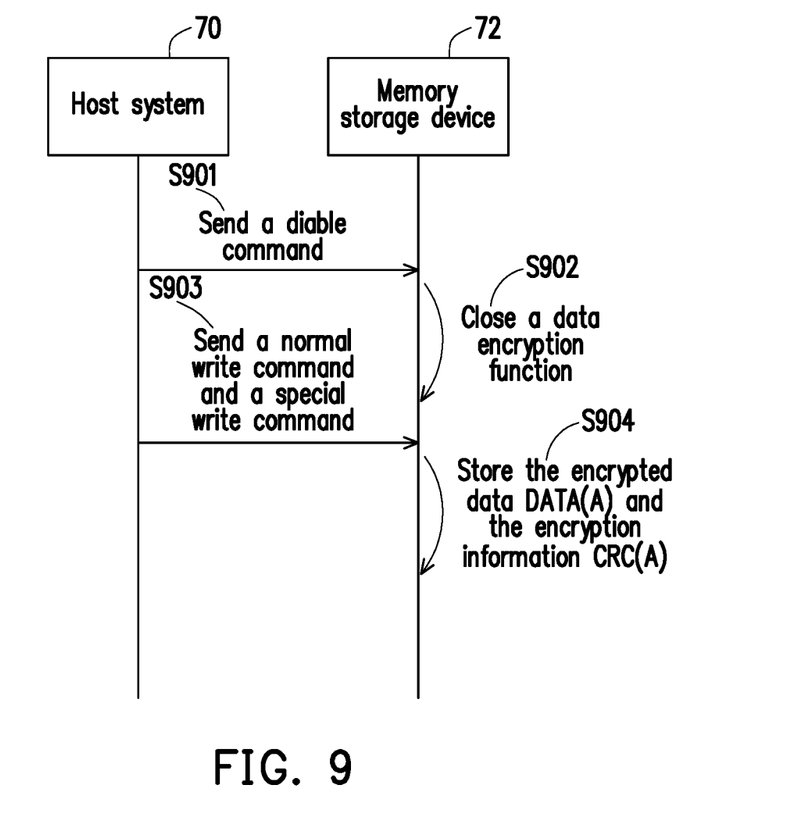
FIG. 9 is a schematic diagram illustrating a timing sequence of communication between the host system and the first memory storage device according to an exemplary embodiment of the disclosure.

FIG. 9 is a schematic diagram illustrating a timing sequence of communication between the host system and the first memory storage device according to an exemplary embodiment of the disclosure. Referring to FIG. 9 and following the exemplary embodiment of FIG. 8, after reading the encrypted data DATA(A) and the encryption information CRC(A) from the memory storage device 71, in step S901, the host system 70 transmits a disable command to the memory storage device 72. The disable command is used to instruct the memory storage device 72 to disable a data encryption function activated by default. Accordingly, in step S902, in response to the disable command, the memory control circuit unit of the memory storage device 72 may disable the data encryption function of the encryption circuit activated by default.

Under a status that the data encryption function of the memory storage device 72 is disabled, in step S903, the host system 70 may send a normal write command and a special write command to the memory storage device 72. The normal write command instructs a storing of the encrypted data DATA(A). The special write command instructs a storing of the encryption information CRC(A).

In step S904, the memory control circuit unit of the memory storage device 72 may store the encrypted data DATA(A) in response to the normal write command and store the encryption information CRC(A) in response to the special write command. It should be noted that although the memory storage device 72 supports the automated data encryption function, as the data encryption function is disabled in advance, the storing of the encrypted data DATA(A) and the storing of the encryption information CRC(A) do not include encrypting the encrypted data DATA (A) and the encryption information CRC(A). Accordingly, a data transfer (or a data recovery) from the memory storage device 71 to the memory storage device 72 in FIG. 7 may be completed.

It should be noted that, in an exemplary embodiment, in step S903, the host system 70 may also transmit only the special write command without transmitting the normal write command. The transmitted special write command may instruct the memory control circuit unit of the memory storage device 72 to store the encrypted data DATA(A) and the encryption information CRC(A) in step S904.

From another perspective, the encryption information CRC(A) stored in the memory storage device 72 is not generated by the memory control circuit unit of the memory storage device 72 (e.g., the encryption circuit of the memory control circuit unit). Later, when it is required to access the encrypted data DATA(A) in the memory storage device 72, the decryption circuit of the memory storage device 72 may decrypt encrypted data DATA(A) according to the encryption information CRC(A) and the decryption key to obtain the raw data.

In an exemplary embodiment, according to the write command received in step S903, the memory control circuit unit of the memory storage device 72 may also store the logical address information corresponding to the encrypted data DATA(A) (the data of the logical unit to which the encrypted data DATA(A) belongs). Later, the logical address information may also be used to decrypt the encrypted data DATA(A) to obtain the raw data of the encrypted data DATA(A).

In an exemplary embodiment, the encryption information (e.g., CRC(A)) may only be read by the special read command and stored by the special write command. Neither the normal read command nor the normal write command can be used to access the encryption information.

Figure 10:
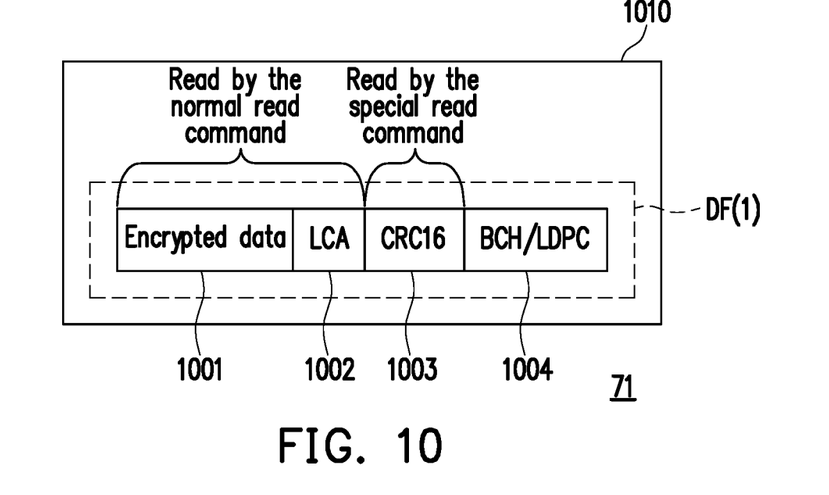
FIG. 10 is a schematic diagram for reading encrypted data and encryption information according to an exemplary embodiment of the disclosure.

FIG. 10 is a schematic diagram for reading encrypted data and encryption information according to an exemplary embodiment of the disclosure. Referring to FIG. 10, it is assumed that encrypted data 1001, logical address information (e.g., LCA) 1002, encryption information (e.g., CRC16 code) 1003 and error correcting information (e.g., BCH or LDPC codes) 1004 are all stored in the same data frame DF(1) in a rewritable non-volatile memory module 1010 of the memory storage device 71. The encrypted data 1001 is stored in a data area of the data frame DF(1), for example. A data size of the encrypted data 1001 may be 4 KB (Bytes). The logical address information 1002, the encryption information 1003 and the error correcting information 1004 are stored in a spare area of the data frame DF(1), for example. A data size of the logic address information 1002 may be 4 B. A data size of the encryption information 1003 may be 2 B.

The encryption information 1003 is generated according to the encrypted data 1001, the logical address information 1002 and the encryption key (or the decryption key) used by the memory storage device 71. Under a status that the data decryption function of the memory storage device 71 is disabled, the normal read command from the host system 70 may be used to read the encrypted data 1001 and the logical address information 1002, and the special read command from the host system 70 may be used to read the encryption information 1003. Alternatively, in an exemplary embodiment, the encrypted data 1001, the logical address information 1002 and the encryption information 1003 may all be read by the special read command from the host system 70.

Figure 11:
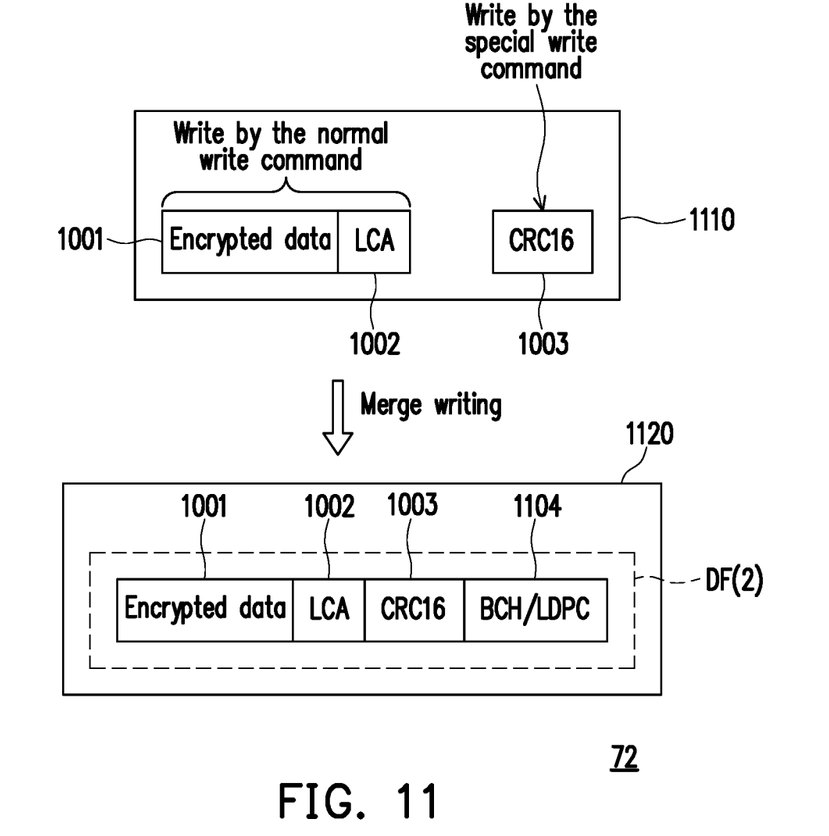
FIG. 11 is a schematic diagram for writing encrypted data and encryption information according to an exemplary embodiment of the disclosure.

FIG. 11 is a schematic diagram for writing encrypted data and encryption information according to an exemplary embodiment of the disclosure. Referring to FIG. 11, after receiving the normal read command from the host system 70, the memory control circuit unit of the memory storage device 72 may temporarily store the encrypted data 1001 and the logical address information 1002 originally stored in the memory storage device 71 to a buffer memory 1110. In addition, after receiving the special write command from the host system 70, the memory control circuit unit of the memory storage device 72 may temporarily store the encryption information 1003 originally stored in the memory storage device 71 to the buffer memory 1110.

Next, under a status that the data encryption function of the memory storage device 72 is disabled, the memory control circuit unit of the memory storage device 72 may read the encrypted data 1001, the logical address information 1002 and the encryption information 1003 from the buffer memory 1110 and send a write command sequence to instruct a storing of the encrypted data 1001, the logical address information 1002 and the encryption information 1003 together to a rewritable non-volatile memory module 1120 of the memory storage device 72. For example, the encrypted data 1001, the logical address information 1002 and the encryption information 1003 may be stored in the same data frame DF(2) of the rewritable non-volatile memory module 1120. For example, the encrypted data 1001 may be stored in a data area of the data frame DF(2). The logical address information 1002 and the encryption information 1003 may be stored in a spare area of the data frame DF(2).

It should be noted that, in an exemplary embodiment, the memory control circuit unit of the memory storage device 72 may also send a write command sequence according to the special write command from the host system 70 to instruct a storing of the encrypted data 1001, the logical address information 1002 and the encryption information 1003 together to the rewritable non-volatile memory module 1120 (e.g., the data frame DF(2)).

In an exemplary embodiment, the memory control circuit unit of the memory storage device 72 may also generate error correcting information (e.g., BCH or LDPC codes) 1104 for protecting the encrypted data 1001, the logical address information 1002 and the encryption information 1003 and store the error correcting information 1104 also in the data frame DF(2). For example, the error correcting information 1104 may also be stored in the spare area of the data frame DF(2).

In summary, after the data decryption function of the second memory storage device activated by default is disabled, the encrypted data and the corresponding encryption information may be respectively read through the customized read commands. In addition, after the data encryption function of the first memory storage device activated by default is disabled, the encrypted data and the corresponding encryption information may be respectively stored to the first memory storage device through the customized write commands. Accordingly, after the data transfer is completed, the old decryption key (e.g., the user password) may still be used to decrypt the encrypted data stored in the first memory storage device, thereby solving the conventional problem that the data recovery cannot be performed on the memory storage devices that support the automated data encryption.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

The previously described exemplary embodiments of the present disclosure have the advantages aforementioned, wherein the advantages aforementioned not required in all versions of the present disclosure.

It will be apparent to those skilled in the art that various modifications and variations can be made to the structure of the disclosure without departing from the scope or spirit of the disclosure. In view of the foregoing, it is intended that the present disclosure cover modifications and variations of this disclosure provided they fall within the scope of the following claims and their equivalents.

What is claimed is:

1. A data transfer method, comprising:
   instructing a first memory storage device to disable a data encryption function activated by default; and
   sending a write command to the first memory storage device under a status that the data encryption function of the first memory storage device is disabled,
   wherein the write command instructs a storing of encryption information corresponding to encrypted data to the first memory storage device,
   the encryption information is not generated by the first memory storage device, and
   the encryption information is unreadable by a normal read command.

2. The data transfer method according to claim 1, wherein the write command comprises a special write command, and the special write command instructs a storing of the encrypted data and the encryption information to the first memory storage device.

3. The data transfer method according to claim 1, wherein the write command comprises a normal write command and a special write command, the normal write command instructs a storing of the encrypted data to the first memory storage device, and the special write command instructs a storing of the encryption information to the first memory storage device.

4. The data transfer method according to claim 3, further comprising:
   sending a write command sequence according to the normal write command and the special write command by a memory control circuit unit to instruct a storing of the encrypted data and the encryption information together to a rewritable non-volatile memory module of the first memory storage device.

5. The data transfer method according to claim 1, further comprising:
   instructing a second memory storage device to disable a data decryption function activated by default; and
   sending the normal read command and a special read command to the second memory storage device under a status that the data decryption function of the second memory storage device is disabled, wherein the normal read command instructs a reading of the encrypted data from the second memory storage device, and the special read command instructs a reading of the encryption information from the second memory storage device.

6. The data transfer method according to claim 1, wherein the encryption information is generated by the second memory storage device according to raw data, logical address information and an encryption key when the raw data is stored to the second memory storage device.

7. The data transfer method according to claim 1, wherein the encryption information is configured to decrypt the encrypted data.

8. The data transfer method according to claim 1, wherein the encrypted data is not generated by a memory control circuit unit of the first memory storage device.

9. The data transfer method according to claim 1, wherein the encryption information comprises a cyclic redundancy check (CRC) code.

10. The data transfer method according to claim 1, wherein the encrypted data and the encryption information are stored in the same data frame.

11. A memory storage device, comprising:
a connection interface unit, configured to couple to a host system;
a rewritable non-volatile memory module; and
a memory control circuit unit, coupled to the connection interface unit and the rewritable non-volatile memory module,
wherein the memory control circuit unit is configured to disable a data encryption function activated by default according to an instruction of the host system,
the memory control circuit unit is further configured to receive a write command from the host system under a status that the data encryption function is disabled,
wherein the write command instructs a storing of encryption information corresponding to encrypted data to the memory storage device,
the encryption information is not generated by the memory storage device, and
the encryption information is unreadable by a normal read command.

12. The memory storage device according to claim 11, wherein the encryption information is configured to decrypt the encrypted data.

13. The memory storage device according to claim 11, wherein the encrypted data is not generated by the memory control circuit unit.

14. The memory storage device according to claim 11, wherein the encryption information comprises a CRC code.

15. The memory storage device according to claim 11, wherein the write command comprises a normal write command and a special write command, the normal write command instructs a storing of the encrypted data to the memory storage device, the special write command instructs a storing of the encryption information to the memory storage device, and the memory control circuit unit is further configured to send a write command sequence according to the normal write command and the special write command to instruct a storing of the encrypted data and the encryption information together to the rewritable non-volatile memory module.

16. The memory storage device according to claim 11, wherein the encrypted data and the encryption information are stored in the same data frame.

17. A memory storage device, comprising:
a connection interface unit, configured to couple to a host system;
a rewritable non-volatile memory module; and
a memory control circuit unit, coupled to the connection interface unit and the rewritable non-volatile memory module,
wherein the memory control circuit unit is configured to disable a data decryption function activated by default according to an instruction of the host system,
the memory control circuit unit is further configured to receive a read command from the host system under a status that the data decryption function is disabled,
the read command instructs a reading of encryption information corresponding to encrypted data from the memory storage device, and
the encryption information is unreadable by a normal read command.

18. The memory storage device according to claim 17, wherein the read command comprises a special read command, and the special read command instructs a reading of the encrypted data and the encryption information from the memory storage device.

19. The memory storage device according to claim 17, wherein the read command comprises a normal read command and a special read command, the normal read command instructs a reading of the encrypted data from the memory storage device, and the special read command instructs a reading of the encryption information from the memory storage device.

20. The memory storage device according to claim 19, wherein the memory control circuit unit is further configured to read the encrypted data from the rewritable non-volatile memory module according to the normal read command,
the memory control circuit unit is further configured to read the encryption information from the rewritable non-volatile memory module according to the special read command, and
the memory control circuit unit is further configured to transmit e encrypted data and the encryption information to the host system.

21. The memory storage device according to claim 17, wherein the memory control circuit unit is further configured to generate the encryption information according to raw data, logical address information and an encryption key when storing the raw data.

22. The memory storage device according to claim 17, wherein the encryption information is configured to decrypt the encrypted data.

23. The memory storage device according to claim 17, wherein the encryption information comprises a CRC code.

24. The memory storage device according to claim 17, wherein the encrypted data and the encryption information are stored in the same data frame.

* * * * *